Nov. 30, 1948. H. J. FISHER 2,455,052
SIGNAL RECEIVING SYSTEM
Filed June 17, 1944 2 Sheets-Sheet 1
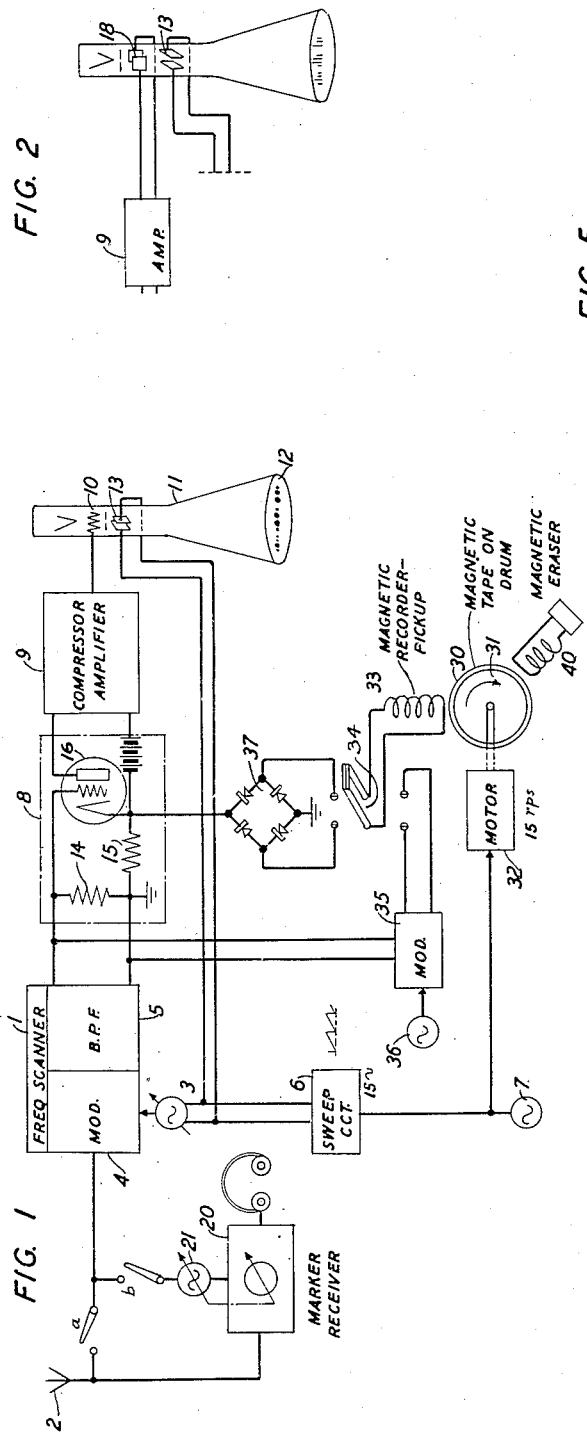
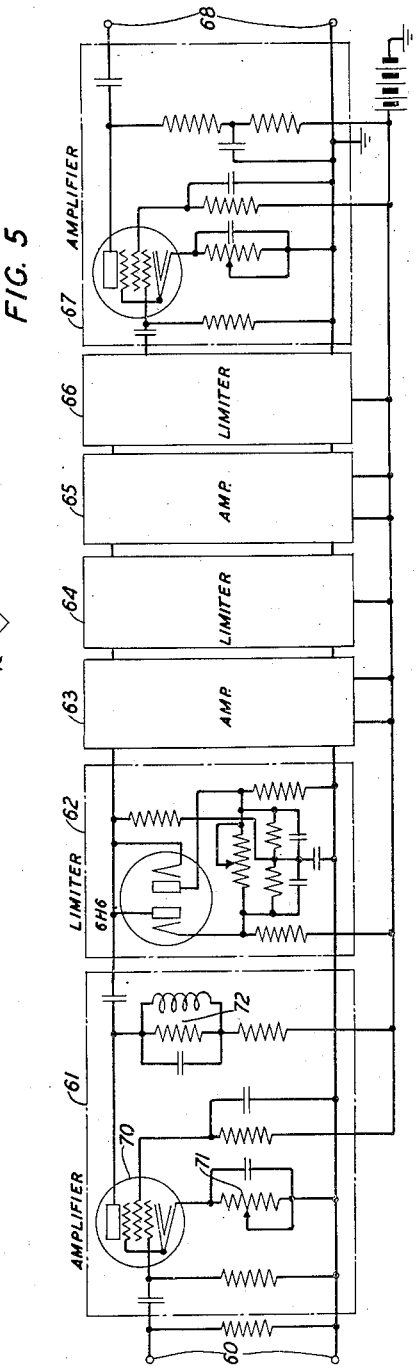
INVENTOR
H. J. FISHER
BY
N. S. Ewing
ATTORNEY Nov. 30, 1948.   H. J. FISHER   2,455,052
SIGNAL RECEIVING SYSTEM
Filed June 17, 1944   2 Sheets-Sheet 2
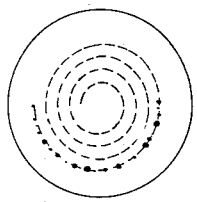
FIG.4
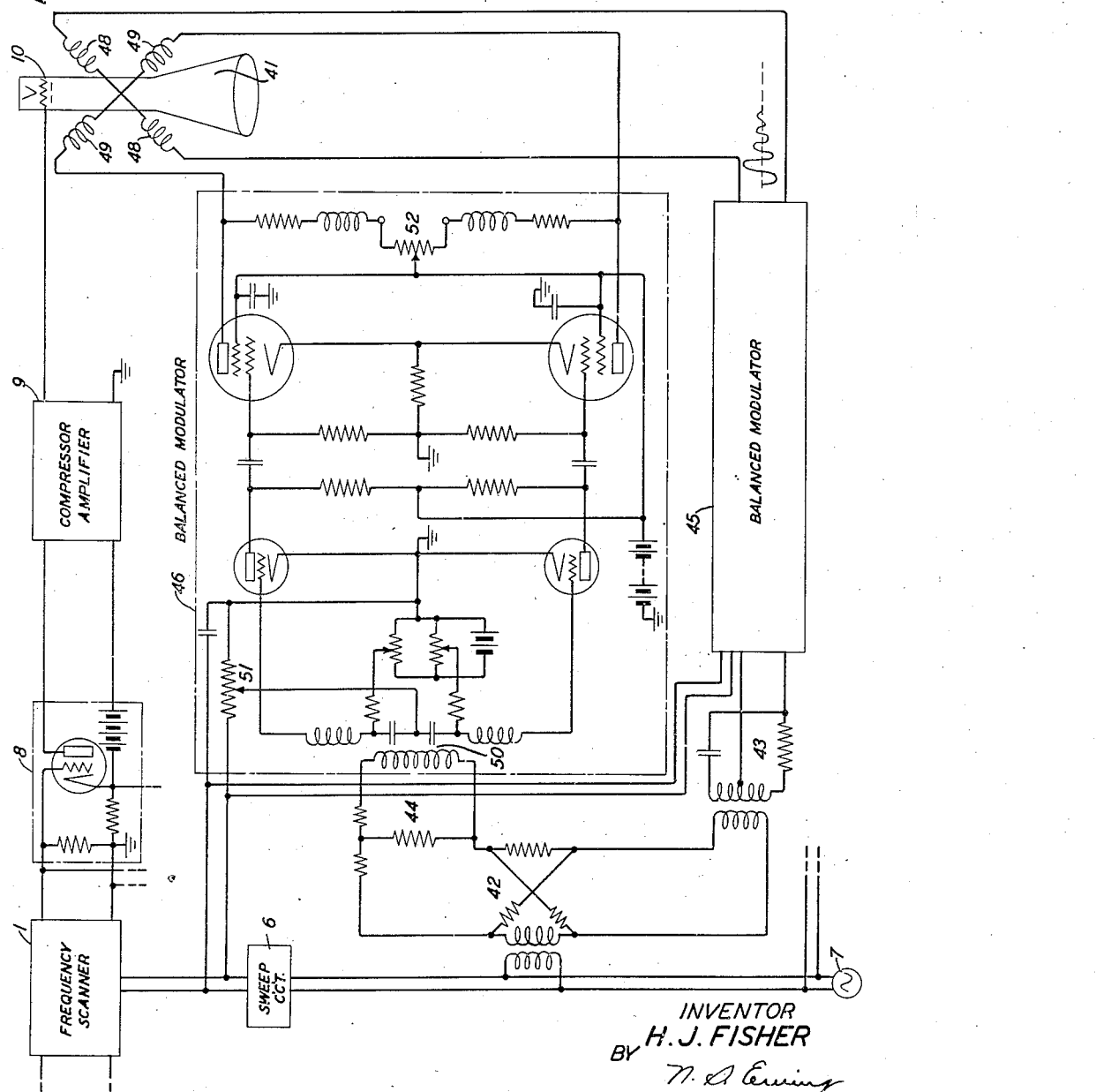
INVENTOR
H. J. FISHER
BY
N. A. Ewing
ATTORNEY Patented Nov. 30, 1948

2,455,052

UNITED STATES PATENT OFFICE 2,455,052

SIGNAL RECEIVING SYSTEM

Harold J. Fisher, Port Washington, N. Y., assignor to Bell Telephone Laboratories, Incorporated, New York, N. Y., a corporation of New York Application June 17, 1944, Serial No. 540,867

6 Claims. (Cl. 250—20)

The present invention relates primarily, although in its broader aspects not exclusively, to so-called panoramic receiver systems and the like in which there is provided a continuous visual indication of the activity, or of the presence or absence of activity, at each frequency within a predetermined range of wave frequencies.

A system of the kind described may be employed, for typical example, to maintain all of the radio frequency channels that lie within a predetermined frequency range under continuous observation, as for the purpose of monitoring the operation of active transmitters and detecting the activity of unauthorized transmitters. The visual indications may take the form of closely spaced luminous spots or lines on the luminescent screen of a cathode ray tube, the position of each luminous mark indicating the operating frequency of a corresponding transmitter and the size or brightness of the mark varying according to the varying strength of the received signal.

One of the objects of the invention is to provide, in effect, for the erasure at will of one or more of the aforesaid visual indications so that, for example, the operator or monitor having once established the identity of a transmitter can remove the unnecessarily distracting effect of its fluctuating luminous indication and concentrate on the transmitters not yet identified. A related object is to facilitate detection of a visual indication immediately upon its appearance so that the character of the signal or identity of the transmitter can be promptly investigated.

Another object is to improve the discrimination between adjacent visual indications and especially to facilitate detection of a weak signal appearing at a frequency closely adjacent that of a strong signal.

Still another object is to block or control the output of a frequency scanner or other cyclically varying translating device at a predetermined point or points in each cycle of variation.

In accordance with the present invention as embodied in a panoramic radio receiver comprising a visual indicator and a frequency scanner for cyclically traversing the frequency range of interest, the transfer of signal effects to the indicator is blocked periodically, but only momentarily, at a selected point in the scanning cycle respectively corresponding to a particular wave frequency or signal. The blocking is effected under the control of pulses derived from a pulse-storing device that is operated in synchronism with the frequency scanner. The said device in one form comprises an endless magnetic tape and associated magnetic recorder-reproducer unit so arranged that pulses may be recorded at any desired points along the tape, the points corresponding to particular signal frequencies, and later reproduced at corresponding points in the scanning cycle.

The nature of the invention and its various features, objects and advantages will appear more fully from a consideration of the embodiments that are illustrated in the drawings and to be described in detail hereinafter. The scope of the invention is set forth in the appended claims.

In the drawings,

Fig. 1 illustrates schematically a panoramic radio receiver embodying the invention;

Fig. 2 illustrates a modification thereof;

Fig. 3 illustrates a modified form of receiver which produces a visual indication of the type shown in Fig. 4; and Fig. 5 is a circuit diagram of an important component of the several receivers.

Referring more particularly now to Fig. 1, the panoramic radio receiver illustrated therein includes a frequency scanner 1 which may be connected through a switch $a$ to radio receiving antenna 2 for the purpose of scanning a predetermined radio frequency range. The scanner 1 is virtually a narrow-band filter the pass frequency of which is repeatedly swept across the predetermined frequency range to obtain successive indications of the intensity of the received radio signals that are successively encountered. It may take the form of a frequency analyzer of the heterodyne type, comprising a modulator 4 and a fixed band-pass filter 5. Beating oscillations are supplied to modulator 4 from a variable frequency oscillator 3, and the operating frequency of the latter is cyclically varied at linear rate from one extreme frequency to another under the control of a saw-toothed voltage wave generator or sweep circuit 6. The latter is so adjusted in relation to the pass frequency of filter 5 that in the output of the modulator 4 one of the sidebands corresponding to the predetermined input frequency range is repeatedly shifted from a frequency position such that one extremity of the sideband coincides with the pass frequency of filter 5 to a position such that the other extremity coincides with it. During each scan, therefore, every signal appearing in the input frequency range of interest will appear momentarily, and translated in frequency, at the output of filter 5. The most favorable width of pass band for filter 5 is dependent on the rate of scanning (cycles per second per second) which is determined by the particular range to be scanned and the number of scans per unit time. The period of the saw-toothed voltage wave determines the repetitive rate of scanning, that is, the number of times per second that the scanner traverses the predetermined frequency range, and if a repetitive rate of fifteen times per second is desired, for example, a sweep circuit frequency of fifteen cycles per second is selected. In accordance with a common practice the operation of the sweep circuit may be stabilized by synchronizing it with an alternating current source 7 of constant frequency.

The output of frequency scanner 1 is connected through a blocking amplifier 8 and a compressor amplifier 9 to the control grid 10 of a cathode ray tube 11 for variably controlling the brightness of the spot produced by the cathode ray on the luminescent screen 12. The brightness of the spot at any instant is an indication of the intensity of the waves being passed by the scanner at that instant. The cathode ray tube 11 comprises also a pair of ray deflecting plates 13 which are connected to the output of sweep circuit 6 so that the luminous spot is driven repeatedly across the screen, say from left to right, along a predetermined linear path. Inasmuch as the movement of the spot and the operation of the frequency scanner 1 are both synchronized with sweep circuit 6 it will be appreciated that each point along the line traversed by the spot is identified with a particular frequency in the received frequency range, that is, the line may be regarded as constituting a frequency axis. The brightness of each spot and to some extent its size also will vary according to the varying intensity of the corresponding signals.

Whereas the cathode ray tube 11 may be unable to accommodate wide changes in the intensity of the voltage applied to control grid 10, amplifier 9 compresses the amplitude range of the voltages applied to it to the more limited range of the cathode ray tube. Circuit details of a suitable amplifier 9 will be described hereinafter with reference to Fig. 5.

The system illustrated in Fig. 1 includes also an auxiliary radio receiver 20. This may be connected to antenna 2, and it is provided to enable the monitor to tune in any desired transmitting station represented on the oscilloscope 11. Associated with the receiver is a variable frequency oscillator 21 the frequency control of which is electrically or mechanically geared with the tuning control of receiver 20 so that the oscillator frequency is always exactly the same as the frequency to which the receiver is tuned. The oscillator 21 may be connected through a switch b to the input of the frequency scanner, and when so connected it produces a bright spot on the screen of the cathode ray tube at a position along the frequency axis corresponding to the frequency to which the auxiliary or "marker" receiver is then tuned. If the monitor wishes to tune in the transmitter represented by a particular spot on the screen it is only necessary to adjust the tuning of the receiver until the spot produced by the frequency marking oscillator 21 moves into coincidence with the particular spot.

Blocking amplifier 8 in Fig. 1 has circuit means associated with it for momentarily blocking the transmission of effects from the frequency scanner 1 to the cathode ray tube 11 at one or more points in the scanning cycle. The associated means include an endless magnetic tape 30 mounted on a drum 31 that is rotated at constant speed by motor 32, and a recorder-pick-up device 33 that can be used alternatively to record electrical effects magnetically on the tape and to pick up or electrically reproduce effects previously recorded thereon. Magnetic recording-reproducing systems of this character are well known in the art and it is believed unnecessary to enter into a more detailed description of this component of the combination. Drum 31 is driven in synchronism with the sweep circuit 6 at a speed such that it completes one rotation while the frequency scanner 1 traverses the frequency range once. That is, if the operating frequency of the sweep circuit is 15 cycles per second, for example, the drum speed would be 15 revolutions per second. Advantageously motor 32 may be of the synchronous type and driven, as indicated in Fig. 1, from the alternating current source 5 that controls sweep circuit 6. Another method would be to synchronize the saw tooth sweep by a pulse, received from motor 32, once per revolution.

The momentary blocking of the amplifier 8 in Fig. 1 is effected by momentarily applying across the grid circuit resistor 15 a high negative grid biasing voltage. This resistor is connected as shown between the cathode of amplifying vacuum tube 16 and the grounded terminal of a resistor 14 which is shunted across the output circuit of filter 5 and the ungrounded terminal of which is connected to the grid of tube 16. The blocking voltage is derived in a manner to be described from pulses or effects previously stored or recorded on the magnetic tape 30. The recording circuit includes a modulator 35 which is supplied with oscillations of fixed frequency from oscillator 36 and which is connected also to receive any waves delivered to the output terminals of frequency scanner 1. The frequency of oscillator 36 is so chosen with reference to the pass frequency of filter 5 that the sideband output of modulator 35 is of audio frequency whereby it can be effectively recorded on magnetic tape 30.

With switch a open and switch b closed to connect the frequency marking oscillator 21 to the input of frequency scanner 1 the only waves in the output circuit of the frequency scanner will be those due to the marking oscillator, and these will appear only once during each scanning cycle. Whether these marker waves appear early or late in the cycle depends only on the frequency of the oscillator 21, but whether early or late each time the waves appear they appear at the same point in the scanning cycle. Likewise, each time they appear the same point on magnetic tape 30 is in recording relation with the device 33. Each point along the magnetic tape is thus identified with a particular marking frequency, or more generally, with a particular radio frequency applied to the input of the frequency scanner 1. With switches a and b in the positions specified, the output of modulator 35 is therefore a succession of low frequency wave pulses, and by throwing switch 34 momentarily to its lower operating position one or more sets of these pulses is applied to device 33 and recorded at a point on the tape 30 respectively corresponding to the marker frequency.

When switch 34 is thrown to its upper operating position device 33 delivers wave pulses of audio frequency picked up from the rotating magnetic tape to full-wave rectifier 37. The latter is connected across grid circuit resistor 15 and it is so poled that each rectified pulse produces a momentary but very large increase in the negative grid bias sufficient to block transmission through the amplifier 8. It is to be noted that the pulses picked up from any particular point on the magnetic tape effect periodic blocking of amplifier 8 at the point in the scanning cycle when the marker frequency waves from which they were derived, or received radio signals of the same frequency, would otherwise be passing from scanner 1 to the oscilloscope. Hence, received signals of that particular frequency are prevented from reaching the oscilloscope as long as the blocking pulses are supplied to amplifier 8, while all other received signals continue to be transmitted to the oscilloscope and produce their respective luminous indications thereon. Any visual indication that is thus "erased," or prevented from appearing on the oscilloscope, may be restored by erasing the pulse recording from the magnetic tape. A demagnetizer for this purpose is represented diagrammatically at 40 in Fig. 1.

The operating procedure in case there are several luminous spots on the screen to be erased is as follows: First the magnetic tape 30 is cleared of previously recorded pulses by means of the magnetic eraser 40. With switches $a$ and $b$ closed and switch 34 open, marking oscillator 21 is adjusted so that the spot produced thereby coincides with one of the spots on the screen that is to be removed. Switch $a$ is then opened. Switch 34 is then operated to its lower or "record" position and opened again. Switch $a$ is again closed while oscillator 21 is adjusted to move the frequency marking spot into coincidence with another of the spots to be removed. The corresponding blocking pulses are then recorded in the manner described, and the procedure is repeated for each other spot that is to be erased. Switch 34 is then thrown to its upper or "reproduce" position so that the pulses stored on the magnetic tape are operative to prevent the unwanted visual indications from appearing on the screen of the oscilloscope. The circuit organization continues to be receptive, of course, to all applied radio frequencies except those that are blocked by the stored pulses.

On occasion it may be found that visual indication of a particular high power transmitter may be so intense or so diffused as to obscure the appearance of weak transmission on a closely adjacent frequency. In such case the strong transmission can be blocked from the cathode ray tube in the manner described so that the visual indication of the weaker transmission can be more easily detected and observed. In some instances in practice it may be found desirable to erase all of the visual indications, having first identified the transmitters, so that the monitor will not be subjected to unnecessary eye strain while waiting for the appearance of unauthorized transmissions and so that the appearance of such transmissions can be immediately detected.

Fig. 2 represents diagrammatically a modification of the Fig. 1 system in which the visual indications are in the form, not of luminous spots, but of parallel luminous lines or spikes that are spaced along the frequency axis on the oscilloscope screen and the length of which fluctuates with the fluctuating intensity of the several received signals. The principal structural changes consist in the substitution of a pair of ray deflecting plates 18 for the control grid 8 in Fig. 1, and connection of the compressor amplifier 9 to the added plates. The latter are oriented to deflect the cathode ray at right angles to the frequency axis, and the intensity of the ray is or may be maintained at a constant value such as to produce a continuous visual trace.

The panoramic receiver illustrated in Fig. 3 differs principally from the Fig. 1 panoramic receiver in respect of the shape of the frequency axis and the circuit means for establishing it. Corresponding parts of the two figures bear the same reference numerals.

The cathode ray oscilloscope 41 in Fig. 3 is provided with two pairs of coils 48 and 49 for magnetically bending the cathode ray in respective planes normal to each other. The control currents applied to the two sets of coils are such that the spot produced by the cathode ray is driven repeatedly, once during each scanning cycle, through a spiral path as illustrated in Fig. 4. This spiral path constitutes the frequency axis corresponding to the straight line frequency axis in Fig. 1, and along it the visual indications corresponding to the various received signals are made to appear in the same manner. The control currents are derived in part from the sweep circuit 6. Alternating currents from the source 7, which may be for specific example a 60-cycle regulated source, are applied through a balanced bridge 42 to two separate circuits one of which includes a phase shifter 43 and the other of which includes an attenuator 44 that introduces the same amount of loss as the phase shifter 43. The phase shifter comprises a coil, resistance and condenser combination proportioned to introduce a phase shift of 90 degrees.

The 60-cycle currents from the devices 43 and 44 are applied to respective balanced modulators 45 and 46. Each of the modulators comprises a balanced triode section having a balanced input transformer and separate grid biasing means for accurately balancing the characteristics of the two triodes. In the common branch of the input circuit a saw-toothed voltage wave derived from the sweep circuit 6 is introduced through potentiometer 51. The triode section is followed by a resistance-condenser coupled balanced amplifier section the output of which is connected across one of the pairs of deflecting coils 48, 49. The control current produced by each modulator is then a 60-cycle sine wave that is amplitude modulated by the saw-toothed wave. If the frequency of the sweep circuit 6 is 15 cycles per second, for example, or one-fourth the frequency of source 7, a four-turn spiral will be produced on the screen of the cathode ray tube 41. The percentage of modulation is controlled by potentiometer 51. Potentiometer 52 which is included in the anode circuit of the amplifier section provides for a small amount of unbalance of the direct current anode voltages, thus allowing a direct current to flow through the deflection coils 48, 49. The potentiometer 52 may be used for centering the trace on the cathode ray tube screen. The inductance and resistance elements associated with potentiometer 52 may be proportioned to provide a time constant that is equal to the time constant of the associated deflection coil, with a view to reducing distortion of the control current.

As in Fig. 1 the output of frequency scanner 1 in Fig. 3 is applied through blocking amplifier 8 and compressor amplifier 9 to the grid 10 of the cathode ray tube. Blocking amplifier 8 is controlled in the manner and by the means described with reference to Fig. 1.

One form that the compressor amplifier 9 may take is illustrated schematically in Fig. 5. As shown, the amplifier comprises four amplifying stages 61, 63, 65 and 67 in tandem with voltage limiters 62, 64 and 66 connected across the circuit between stages. Each stage comprises a high gain amplifying pentode tube 70, a condenser-shunted variable resistance 71 in the common portion of the grid and anode circuits for biasing the control grid and adjusting the gain of the stage, and an interstage impedance branch 72 that is designed to have high impedance at the operating frequency. The operating frequency is the pass frequency of the filter 5 in frequency scanner 1.

Each of the limiters comprises a double-diode tube, such as the type 6H6, and the two diode sections thereof are shunted in oppositely poled relation across the output of the preceding amplifier each in series with a biasing voltage that is derived from a voltage drop across the resistors in the limiter. The biasing voltages are equal and of such polarity as to oppose the flow of current through the diodes. When the voltage of the waves being amplified increases to a value such that the biased diodes become conducting, the interstage shunt impedance drops to a relatively low value, of about 1000 ohms, for example, determined largely by the conductance of the diodes. The action is instantaneous. Whenever the alternating voltage applied across any interstage circuit exceeds the diode cut-off voltage the wave essentially can no longer rise in amplitude, although actually it does increase somewhat because the diode is not perfectly conducting. Both the positive and the negative lobes of the applied waves are clipped or limited.

The clipping or flattening of the top of an applied wave in any of the three limiters except the last one brings into play the impedance branch 72 in the following amplifier stage. This impedance branch is rather sharply tuned to the frequency of the applied waves and it discriminates against transmission of the various harmonics that are introduced by the limiting operation.

Assuming that all of the limiters 62, 64 and 66 are equally biased, consider the effect on an applied sine wave the voltage of which is progressively increased. If the voltage of the applied wave is small enough, the wave may not become great enough even after passing through the amplifier stages 61, 63 and 65 to operate any of the limiters. Hence in passing through the amplifier, it will receive the full benefit of the maximum gain of which the several amplifier stages are capable. An applied wave of sufficiently higher voltage will, after three stages of amplification, be subjected to the clipping action of limiter 66. With further increase in the applied voltage, the wave at the output of amplifier stage 63 will be great enough to be flattened by limiter 64. The flattened wave is passed to amplifier stage 65, which suppresses the harmonics and delivers the fundamental components to limiter 66 where they may again be operated on. Applied waves of maximum voltage are operated on by all of the limiters, the second and third limiters operating successively on the fundamental components selectively transmitted by the preceding amplifier stage. It can be shown that the compression effected in this manner is substantially continuous over the entire range of applied voltages.

A compressor amplifier of the kind described is capable of reducing voltage variations extending over a 60-decibel range to a range of four decibels. The latter range is within the range of variations accommodated by presently available cathode ray tubes and the former is great enough to accommodate the variations in received signal strength likely to be encountered in practice.

Although the present invention has been described with reference to a specific embodiment and specific application or field of use, it will be understood that the invention is susceptible of various modifications within the spirit and scope of the appended claims.

What is claimed is:

1. In combination, a wave receiver including means for cyclically scanning a predetermined frequency range and selecting in repeated succession such received waves of different frequencies as may be present therein, means responsive to waves selected by said last-mentioned means for creating visual indications individual to the waves of different frequencies that are present, means for applying oscillations of definite frequency to said receiver at will exclusively of received waves whereby said oscillations may be cyclically selected thereby, and means controlled by the oscillations so selected for preventing response of said responsive means to selected waves of a particular frequency without interfering with the response to selected waves of a different frequency.

2. An electrical system comprising means for selecting in cyclically repeated succession waves of different frequencies that may be simultaneously applied thereto, utilization means connected to said selecting means to receive therefrom effects derived from the several waves successively selected thereby, and means including a source of local oscillation applicable at will to said selecting means for momentarily disabling said system periodically in synchronism with the cyclical operation of said selecting means at any of a multiplicity of different points in the cycle identified with corresponding different wave frequencies.

3. In combination, means for selecting in cyclically repeated succession such applied waves of different frequencies as may be within a predetermined frequency range, means for applying oscillations of predetermined frequency at will to said first-mentioned means, means for recording wave effects derived from the operation of said first-mentioned means on said oscillations, and means for synchronizing said recording means with the cyclical operation of said first-mentioned means.

4. A combination in accordance with claim 3 including means for periodically reproducing the recorded wave effects, and means for modifying the output of said first-mentioned means under the control of the reproduced effects.

5. In combination, means for receiving waves of different frequencies lying within a predetermined wave frequency range, wave output means, means for delivering said received waves of different frequencies in cyclically repeated succession to said wave output means, an oscilloscope, a path for transmitting wave effects from said output means to said oscilloscope, a source of oscillations of adjustable frequency, means for connecting said source at will to said receiving means, recorder-reproducer means, means for connecting said recorder-reproducer means at will to said output means to record wave effects, and means for blocking transmission through said path periodically under the control of effects derived from the recorded wave effects.

6. In combination, means for receiving simultaneously any radio waves lying within a wide frequency range, means connected to said receiving means for selecting effects derived from the received waves of different frequencies taken in cyclically repeated succession, a cathode ray tube including ray controlling means, electric circuit means for delivering said selected effects to said ray controlling means, means operative to prevent delivery of said effects, and means for operating said last-mentioned means periodically at any desired points in the selection cycle, said operating means including an endless record and means for continually, cyclically reproducing recorded effects therefrom.

HAROLD J. FISHER.

REFERENCES CITED

The following references are of record in the file of this patent:

UNITED STATES PATENTS

| Number | Name | Date |
|---|---|---|
| 1,883,907 | Hathaway | Oct. 25, 1932 |
| 1,970,424 | Frink | Aug. 14, 1934 |
| 1,994,232 | Schuck, Jr. | Mar. 12, 1935 |
| 2,084,760 | Beverage | June 22, 1937 |
| 2,273,914 | Wallace | Feb. 24, 1942 |
| 2,279,246 | Podliasky et al. | Apr. 7, 1942 |
| 2,312,203 | Wallace | Feb. 23, 1943 |
| 2,409,012 | Bliss | Oct. 8, 1946 |

OTHER REFERENCES

"Panoramic Radio Spectroscopes," Panoramic Radio Corp., 242–250 West 55th Street, New York city, 1942, 250—20.41P.